United States Patent [19]

Hopeck et al.

[11] Patent Number: 5,473,207
[45] Date of Patent: Dec. 5, 1995

[54] COOLING PADS FOR WATER-COOLED STATOR CORES IN DYNAMOELECTRIC MACHINES AND METHODS OF FABRICATION

[75] Inventors: James F. Hopeck, Mechanicville; Susan M. Hyde; James R. Pederson, both of Schenectady, all of N.Y.

[73] Assignee: General Electric Co., Schenectady, N.Y.

[21] Appl. No.: 145,636

[22] Filed: Nov. 4, 1993

[51] Int. Cl.[6] .............................. H02K 9/22; H02K 1/20; H02K 15/00
[52] U.S. Cl. .................. 310/65; 310/42; 310/54
[58] Field of Search .................. 310/52, 42, 54, 310/65; 29/596

[56] References Cited

U.S. PATENT DOCUMENTS

| | | | |
|---|---|---|---|
| 513,420 | 1/1894 | Rowland | 310/65 |
| 1,793,434 | 2/1931 | Blathy | 310/65 |
| 2,561,737 | 7/1951 | Hill | 310/65 |
| 2,618,756 | 11/1952 | Fechheimer | 310/54 |
| 3,431,443 | 3/1969 | Essén | 310/65 |
| 3,447,002 | 5/1969 | Rönnevig | 310/54 |
| 3,597,645 | 8/1971 | Duffert et al. | 310/54 |
| 4,061,937 | 12/1977 | Goel et al. | 310/65 |
| 5,073,734 | 12/1991 | Combette | 310/65 |

OTHER PUBLICATIONS

General Electric Co., Preliminary Design Review, "IED Motor/Generator, Water Cooled Stator Core & Armature Winding," V. DiGrande, May 17–18, 1990.

General Electric Co., Preliminary Design Review, "IED Motor/ Generator, Stator Producibility," J. F. Hopeck, May 17–18, 1990.

General Electric Co., Preliminary Design Review, "IED Motor/Generator, Stator Core Cooling Analysis," S. M. Hyde, May 17–18, 1990.

General Electric Co., "Water Cooled Core Design Concept," pp. 4–288 through 4–290, Mar. 9, 1990.

General Electric Co., "Stator," pp. 4–205 through 4–216, Jun. 8, 1990.

General Electric Co., "Stator," pp. 4–205 through 4–215, Mar. 9, 1990.

General Electric Co., "Cooling Pad Losses," pp. 4–16 through 4–24, Mar. 9, 1990.

General Electric Co., "Core Cooling Pads," pp. 4–134 and 4–138, Mar. 9, 1990.

Primary Examiner—Clayton E. LaBalle
Attorney, Agent, or Firm—Nixon & Vanderhye

[57] ABSTRACT

Each cooling pad includes a plurality of concentric cooling robes (24) prefabricated and cast within the cooling pad (20). The robes are formed of stainless steel and, prior to casting, are coated by a plasma spray process with aluminum to ensure an integral bond between the cast and sprayed aluminum and hence between the robes and the east pad to minimize or eliminate voids between the cooling robes and aluminum cooling pad. The inlets (26) and outlets (28) of the robes are coupled to inlet and outlet manifolds (32, 34), respectively, along the outer periphery of the cooling pad. The cooling pad is interspersed between stator core laminations and supplied with deionized water whereby the cooling pads cool the stator core.

19 Claims, 4 Drawing Sheets

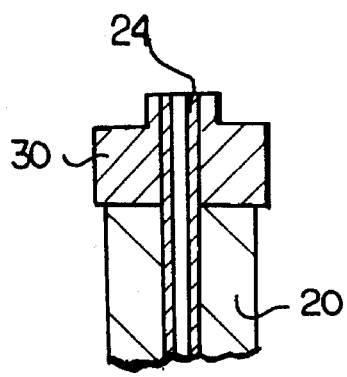
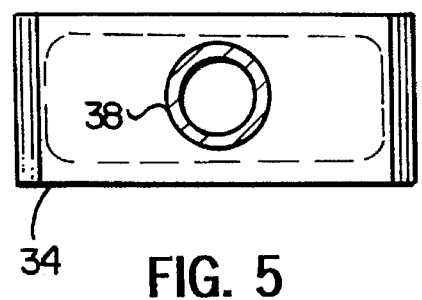
FIG. 4
FIG. 5
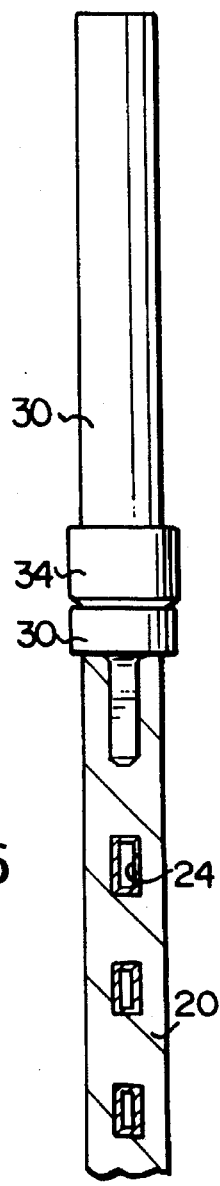
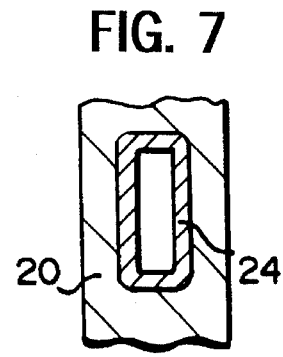
FIG. 7
FIG. 6

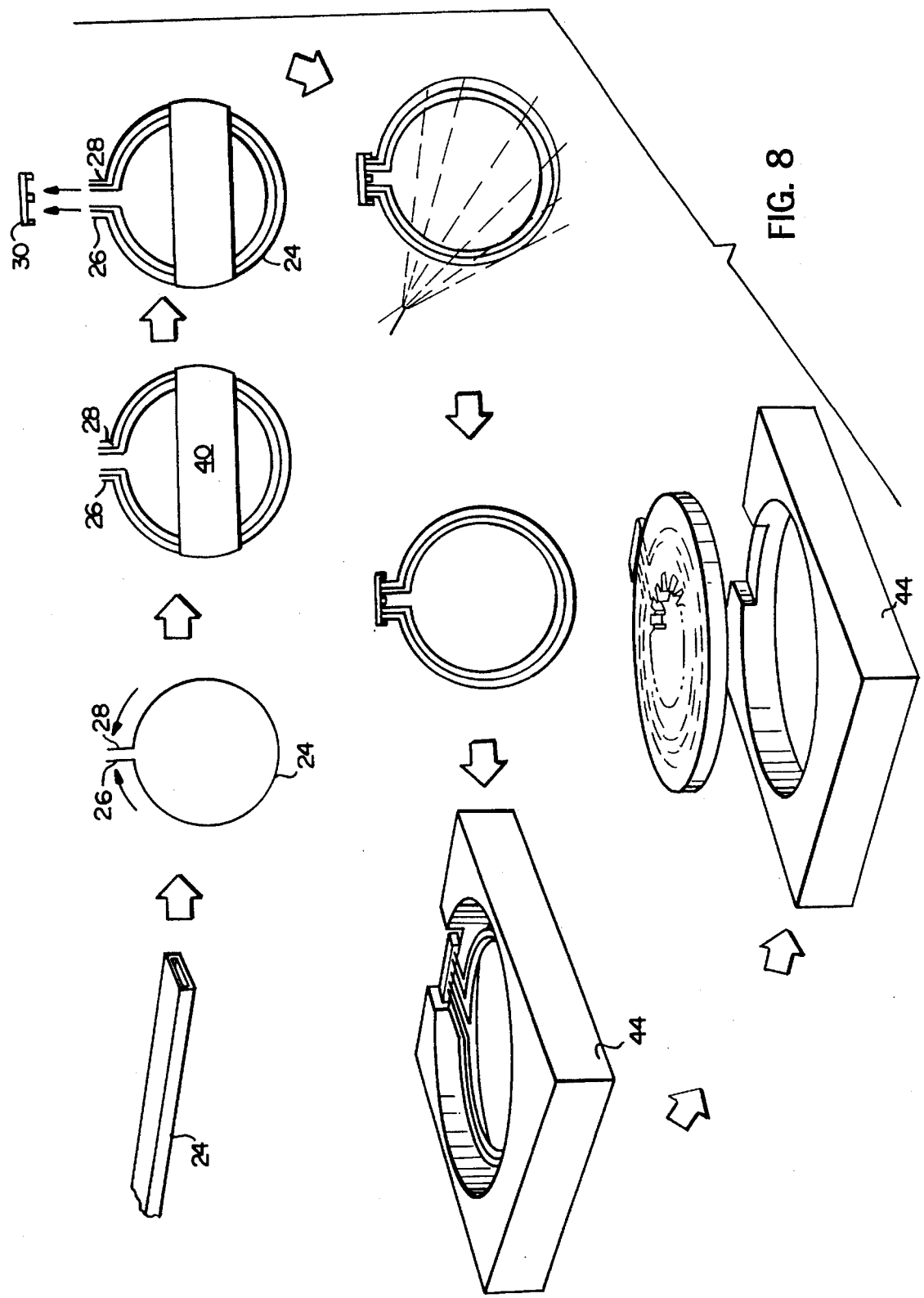

COOLING PADS FOR WATER-COOLED STATOR CORES IN DYNAMOELECTRIC MACHINES AND METHODS OF FABRICATION

The United States Government has rights to this invention in accordance with Navy Contract No. N00024-89-S-4018.

TECHNICAL FIELD

The present invention relates to cooling pads for dynamoelectric machines and particularly relates to cooling pads for a water-cooled stator core of a dynamoelectric machine and methods of fabricating the cooling pads with integral cooling tubes.

BACKGROUND

In many environments where dynamoelectric machines are used, very high power density requirements, along with severe weight, volume and noise requirements, dictate a need for additional cooling of the stator. For example, for shipboard use, direct water-cooling of the dynamoelectric machine is attractive. While water-cooling of stator windings for dynamoelectric machines has been used extensively in the past, very little effort, to applicants' knowledge, has been directed to water-cooling the stator core. Prior stator core cooling has been, for the most part, limited to air and gas cooling. Air and gas cooling requires the use of space blocks or similar assemblies to create passages to allow air/gas movement through the core. Fans are also necessarily employed, typically at both ends of the rotor, to obtain the required flow. These requirements, however, add to the core length, which increases weight and volume. The fans also increase the noise level.

As indicated, prior efforts to water-cool stator cores have been considerably limited. For example, a dynamoelectric machine has been built using an outside diameter water jacket. This, however, did not provide water-cooling within the core itself but only about the core. Additionally, U.S. Pat. No. 3,597,645 discloses a liquid cooling system for the stacks of stator core laminations of a dynamoelectric machine. This patent, however, provides for radial flow paths for the water in hollow cooling pads arranged in sectors about the circumference of the core. Where space, volume and weight as well as noise requirements are a consideration in the design of a dynamoelectric machine, this type of water-cooled stator core is notably deficient.

DISCLOSURE OF THE INVENTION

According to the present invention, there is provided direct water-cooling of motor/generator stator cores by using a cooling pad (heat sink), preferably formed of aluminum, and in which stainless steel tubes, preferably rectangular in cross-section, are embedded within the aluminum for water flow. The aluminum pad is annular and interspersed among the stator core laminations for direct contact therewith. Thus, in the present invention, a plurality of tubes, preferably concentric and formed of stainless steel, are integrally cast in an annular aluminum cooling pad for disposition between stator core laminations to enable direct water core cooling of the stator core. The aluminum pad with integrally cast water-cooling tubes affords excellent thermal capabilities that reduce any required air cooling and simultaneously accommodate the weight, volume and noise requirements, as previously indicated.

More particularly, and in a preferred embodiment of the present invention, a series of aluminum cooling pads are integrally cast about a plurality of generally annular stainless steel cooling tubes, the pads being for disposition between the laminations of the stator core. Each cooling pad includes preferably three stainless steel tubes disposed in a circular and concentric relation relative to one another within the annular cooling pad, with each tube having a discrete inlet and an discrete outlet connected to a common inlet manifold and an common outlet manifold, respectively. The rectilinear tubes are arranged such that their long dimension lies in a plane passing through and wholly containing the annular pad. Thus, the preferred three tubes extend generally 360° about the annular pad in radially spaced relation to one another, with their inlets and outlets closely circumferentially adjacent one another. When disposed between the stator core laminations, the manifolds, which are external to the pads in a radial direction, are arranged in parallel one with the other such that deionized water may be circulated through the tubes to effectively cool the stator core through the aluminum pads.

Preferably, the pads are located according to the calculated flux, density and heat distribution within the stator core. Importantly, for maximum thermal conductivity, an integral or intrinsic bond must exist between the stainless steel tubes and the aluminum pad heat sink. This requires the minimization or elimination of any small voids at the interface between the stainless steel and the aluminum in order to avoid hot spots and non-uniform cooling. To accomplish this, the tubes are formed into a series of generally concentric tubes having radially extending tubular portions forming an inlet and an outlet. The tubes are concentrically arranged in a fixture with the long sides of their rectangular cross-sections lying in common planes within and parallel to the plane of the pad to be formed about the tubes. The tubes are then welded to the manifolds thereby forming a cooling tube fabrication sub-assembly.

To create the necessary integral and intrinsic bond between the aluminum casting of the pad and the stainless steel tubes, a coating of pure aluminum is deposited on the tubes, preferably by a plasma spray procedure, such that all of the tubes in their areas to be included within the casting are coated with aluminum. The coating preferably has a thickness of between 0.016 to 0.024 inches. The cooling tube fabrication sub-assembly is then placed in a mold and an aluminum casting is produced with the tubes lying wholly within the cast aluminum pad except for the radially projecting manifolds. The bond strength between the deposited aluminum and stainless steel is very high, on the order of 2300 psi. The cast aluminum and sprayed aluminum bond to one another creating an intrinsic bond which minimizes or eliminates voids therebetween.

In a preferred embodiment according to the present invention, there is provided a cooling pad for a water-cooled stator core of a dynamoelectric machine comprising an annular pad for disposition between stator core laminations in the dynamoelectric machine and having at least a pair of generally circumferentially extending cooling tubes disposed in the annular pad at radially spaced, substantially concentric locations relative to one another, each of the tubes having an inlet and an outlet and extending circumferentially substantially completely about the pad.

In a further preferred embodiment according to the present invention, there is provided a water-cooled stator core for a dynamoelectric machine comprising a plurality of stacked, generally annular, stator core laminations, and a plurality of generally annular cooling pads interspersed between at least certain adjacent laminations in the stack thereof, each of the pads including a generally circumferentially extending cooling tube carried by the annular pad, each tube having an inlet and an outlet for flowing cooling water therethrough and extending circumferentially substantially about the pad.

In a still further preferred embodiment according to the present invention, there is provided a method of forming a cooling pad for a water-cooled stator core of a dynamoelectric machine comprising the steps of depositing a coating of aluminum on a generally annular stainless steel cooling tube by plasma-spraying the aluminum onto the tube, disposing the aluminum-coated tube in a mold for forming a generally annular cooling pad and depositing molten aluminum into the mold to produce an aluminum pad casting thereby embedding the aluminum spray-coated tube in all areas of the mold included in the casting with the cast aluminum bonding to the spray-coated aluminum.

Accordingly, it is a primary object of the present invention to provide novel and improved water-cooled cooling pads for the stator core of a dynamoelectric machine and methods of fabricating the cooling pads.

BRIEF DESCRIPTION OF THE DRAWINGS

FIG. 4 is a cross-sectional view thereof taken generally about on line 4–4 in FIG. 3;

FIG. 5 is a cross-sectional view taken generally about on line 5–5 in FIG. 2;

FIG. 6 is a cross-sectional view taken generally about on line 6–6 in FIG. 2;

FIG. 7 is an enlarged cross-sectional view taken generally about on line 7—7 in FIG. 2; and FIG. 8 schematically illustrates a series of steps for forming a cooling pad according to the present invention.

BEST MODE FOR CARRYING OUT THE INVENTION

Figure 1:
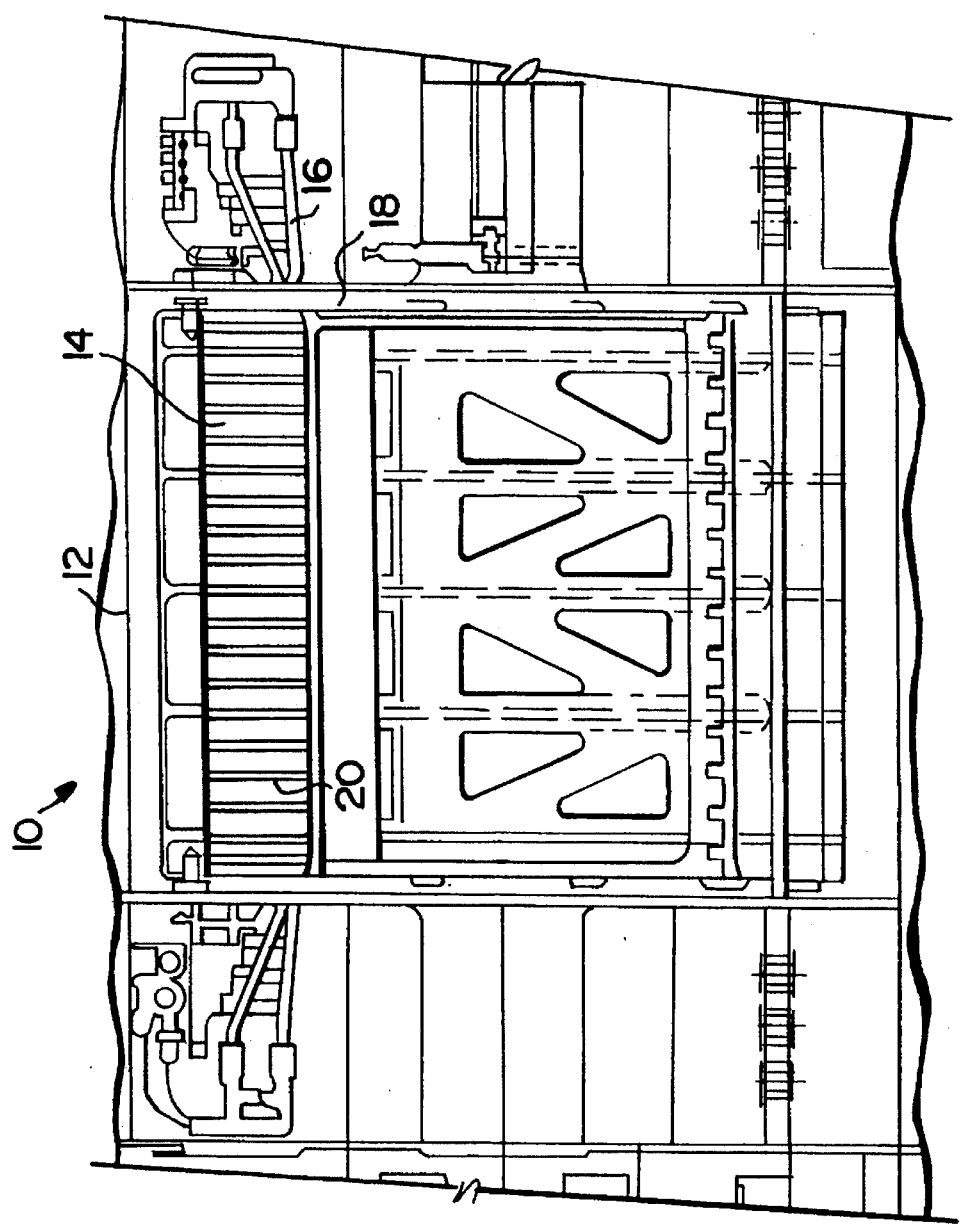
FIG. 1 is a fragmentary schematic illustration of a dynamoelectric machine constructed in accordance with the present invention.
Figure 2:
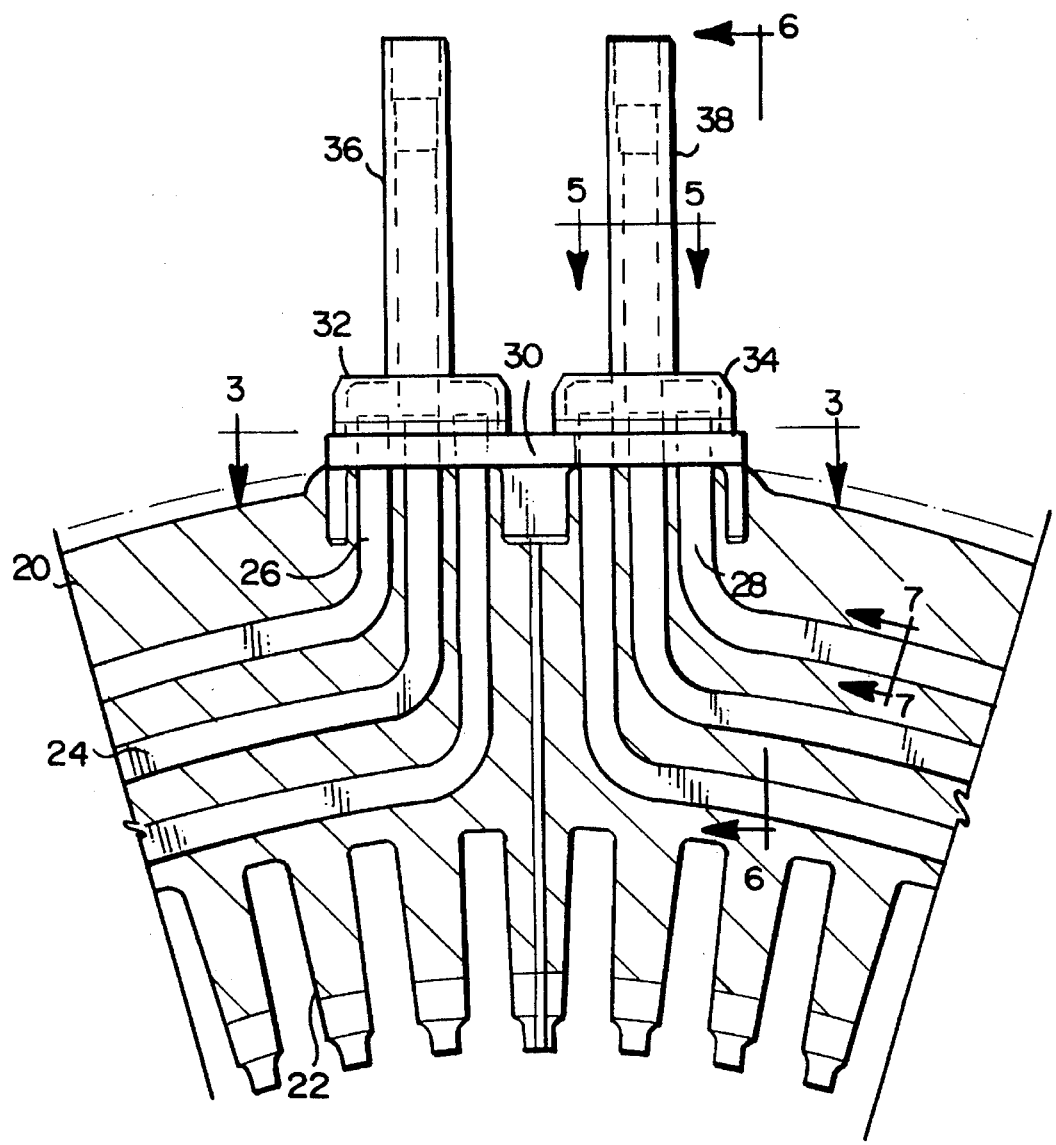
FIG. 2 is a fragmentary enlarged cross-sectional view of a portion and through the plane of a cooling pad adjacent the manifolds illustrating the three cooling tubes of a preferred embodiment of the present invention.
Figure 3:
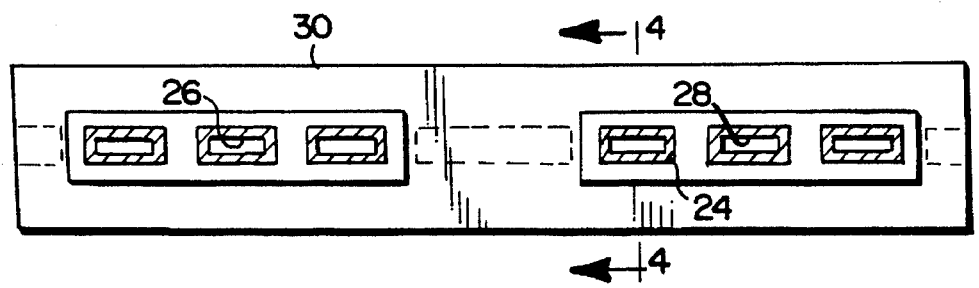
FIG. 3 is a cross-sectional view thereof taken generally about on line 3—3 in FIG. 2.

Referring now to the drawing figures, particularly to FIG. 1, there is illustrated a dynamoelectric machine, generally designated 10. The various elements of the dynamoelectric machine are well known in the art and a detailed description of the machine is not necessary. Suffice to say that the dynamoelectric machine 10 includes a housing 12 about a stack of stator core laminations 14, stator windings 16, and end plates 18 for maintaining the stator laminations in stacked relation. Interspersed between certain of adjacent stator laminations 14 are cooling pads 20 constructed in accordance with the present invention. Referring to FIG. 2, each cooling pad 20 is in the form of a thin annulus, for example, on the order 0.5 inches thick, having a plurality, for example, 72 stator fingers 22 extending radially inwardly from the inner surface of the pad.

In accordance with the present invention and within each cooling pad 20, there is provided a plurality of cooling tubes 24, each of which extends about the annular cooling pad substantially for a full circle. Preferably, three cooling tubes 24 are used and arranged in cooling pad 20 in generally concentric, radially spaced relation to one another as illustrated in FIG. 2. Each cooling tube 24 has an inlet 26 and an outlet 28, each projecting generally radially of the pad. Each inlet and outlet 26 and 28, respectively, passes through a manifold block 30 to which is coupled an inlet manifold 32 and an outlet manifold 34 in fluid communication with the respective inlets 26 and outlets 28. Thus, deionized water may be provided in inlet pipe 36 to inlet manifold 32 for distribution of the water into each of the tubes 24. Likewise, the outlets 28 flow the cooling water from the tubes 24 into the outlet manifold 34 and into an outlet pipe 38. While not shown, the inlet and outlet pipes of the pads of the stator core are connected in parallel with supply and return pipes, also not shown.

As illustrated in FIG. 7, each of the tubes 24 is rectangular in cross-section and is disposed in the pad 20 such that the longest dimension of the rectangular cross-section lies in a plane parallel to the pad 20. Use of rectangular tubes maximizes the volume of water flow and the surface of the tube in heat transfer relation with the pad. Given the size and cooling requirements for cooling pads, it has been found that three tubes having rectangular cross-sections and arranged in this manner within the pad are most efficient for cooling purposes. Preferably, the tubes 24 are formed of austenitic stainless steel. Stainless steel is preferred because of its strength and the ability of the stainless steel material to avoid contamination such as rust and oxidation when used with deionized water.

The pad 20 is preferably formed of cast aluminum. While any good heat transfer material may be used, such as copper, other considerations such as weight dictate the use of aluminum. Accordingly, the pads 20 are preferably formed of cast aluminum with the stainless steel tubes 24 completely embedded within the cast aluminum pads. None of the surfaces of the stainless steel tubes are exposed through the annular surfaces of the pad 20. The only exposure of the tubes 24 through the pad is at their radially outermost inlets and outlets 26 and 28, respectively. By interposing aluminum pads between the stator laminations and flowing deionized water through the tubes 24, water cooling of the stator core laminations is achieved.

To fabricate the cooling pad 20 according to the present invention and with reference to FIG. 8, the stainless steel tubes 24 are provided, usually in linear lengths as illustrated. The tubes 24 are then formed into a circular configuration with inlet and outlet ends extending generally parallel to one another and generally along a radius of the annular tube. The tubes 24 are, of course, formed into the generally annular configuration with their long axis lying in the plane of the annulus. The tubes may be banded as illustrated at 40 to facilitate the application of the manifold block 30 and manifolds 32 and 34. The manifold block is then secured to the inlet 26 and outlet 28 of each tube 24 by welding. When secured, it will be appreciated that a unitary cooling tube fabrication sub-assembly is formed.

In order to create an integral intrinsic bond between the stainless steel and the pad during final fabrication, the banding is removed and the cooling tubes of the cooling tube fabrication sub-assembly are coated with pure aluminum. To coat the tubes, a plasma-spray process is employed as illustrated to apply a uniform coating to the tubes of the sub-assembly. The coating is applied to approximately a preferred thickness of 0.016 to 0.024 inches. Once coated, the aluminum-coated cooling tube fabrication sub-assembly is disposed in a mold 44. Chaplets may be used to secure the sub-assembly in the mold, the chaplets being fused within the pad during final casting of the aluminum. By accurately locating the fabrication sub-assembly within the mold and casting aluminum into the mold, an aluminum casting is produced wherein voids between the cast aluminum and sprayed aluminum are substantially minimized or eliminated.

Preferably, the tubes 24 are approximately 0.25 inches in width, i.e., in an axial direction relative to the cooling pad, and the cooling pad per se has an axial extent or thickness of approximately 0.5 inches. The length of the tube cross-section in the plane of the pad is approximately 0.550 inches.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cooling pad for a water-cooled stator core of a dynamoelectric machine comprising:

an integral annular one-piece pad for disposition between stator core laminations in the dynamoelectric machine; and at least a pair of generally circumferentially extending cooling tubes disposed in said annular pad at radially spaced, substantially concentric locations relative to one another;

each of said tubes having an inlet and an outlet and extending circumferentially substantially completely about said pad, each tube being embedded within said pad and surrounded by material forming said pad such that all surfaces of the circumferentially extending tubes embedded within said pad are not exposed through annular faces of said pad.

2. A cooling pad according to claim 1 wherein said pad is formed of a material cast about said tubes.

3. A cooling pad according to claim 1 wherein said pad is formed of aluminum cast about said tubes.

4. A cooling pad according to claim 3 wherein said tubes are formed of stainless steel.

5. A cooling pad according to claim 1 wherein each tube is formed of stainless steel and said pad is formed of aluminum cast about said tubes such that all surfaces of the circumferentially extending tubes lie within said pad and are not exposed through annular faces of said pad.

6. A cooling pad according to claim 1 wherein each of said tubes has a rectangular cross-section with a long dimension thereof lying in a plane containing said pad.

7. A cooling pad according to claim 6 wherein each tube is formed of stainless steel and said pad is formed of aluminum cast about said tubes such that all surfaces of the circumferentially extending tubes lie within said pad and are not exposed through annular faces of said pad, said inlets for said tubes being coupled to an inlet manifold for receiving cooling water and flowing cooling water through said inlet into said tubes, said outlets for said tubes being coupled to an outlet manifold for receiving cooling water from said tubes and passing through said outlets into said outlet manifold.

8. A cooling pad according to claim 7 wherein said inlet and outlet manifolds lie at closely adjacent circumferentially spaced positions relative to one another and radially of said pad.

9. A cooling pad according to claim 1 including a third generally circumferentially extending cooling tube embedded within said annular pad at a radially spaced location relative to said pair of cooling tubes, each of said tubes being radially spaced from one another and embedded in said pad and surrounded by material forming said pad such that all surfaces of the circumferentially extending tubes embedded within said pad are not exposed through the annular faces of said pad.

10. A water-cooled stator core for a dynamoelectric machine comprising:

a plurality of stacked, generally annular, stator core laminations; and a plurality of generally integral annular one-piece cooling pads interspersed between at least certain adjacent laminations in the stack thereof;

each of said pads including a generally circumferentially extending cooling tube carried by and embedded within said annular pad, each tube having an inlet and an outlet for flowing cooling water therethrough and extending circumferentially substantially about the full annular extent of said pad, said tubes being surrounded by material forming said pads such that all surfaces of the circumferentially extending tubes embedded within said pads are not exposed through annular faces of said pads.

11. A stator core according to claim 10 wherein each of said pads includes a plurality of generally circumferentially extending, concentric, discrete cooling tubes embedded within said annular pad, with each tube having an inlet and an outlet extending through radially outer portions of said pad.

12. A stator core according to claim 11 wherein said pads are formed of a cast aluminum material and said tubes are formed of stainless steel.

13. A stator core according to claim 11 wherein said tubes have a rectangular cross-section with a long dimension thereof lying in a plane containing said pad, said inlets for said tubes being coupled to an inlet manifold for receiving cooling water and flowing cooling water through said inlets into said tubes and said outlets for said tubes being coupled to an outlet manifold for receiving cooling water from said tubes and passing through said outlets into said outlet manifold.

14. A stator core according to claim 10 wherein said inlet and outlet lie at closely adjacent circumferentially spaced positions relative to one another and along an outer diameter of said pad, each tube being formed of stainless steel and having a coating of aluminum deposited by a plasma spray process, said pad being formed of aluminum cast about said aluminum spray-coated tubes forming an integral bond therewith.

15. A method of forming a cooling pad for a water-cooled stator core of a dynamoelectric machine comprising the steps of:

depositing a coating of aluminum on a generally annular stainless steel cooling tube by plasma-spraying the aluminum onto the tube;

disposing the aluminum-coated tube in a mold for forming a generally annular cooling pad; and depositing molten aluminum into the mold to produce an aluminum pad casting thereby embedding the aluminum spray-coated tube in all areas of the mold included in the casting with the cast aluminum bonding to the spray-coated aluminum.

16. A method according to claim 15 including depositing a coating of aluminum on a plurality of stainless steel tubes, arranging said tubes in the mold in a generally concentric relation to one another and depositing the molten aluminum into the mold to bond the aluminum spray-coated tubes and the cast aluminum.

17. A method according to claim 16 including providing tubes with a rectilinear cross-section and disposing the aluminum-coated tubes in the mold such that the long dimension of the rectilinear cross-section of the tubes lies in the plane of the cooling pad to be cast within said mold.

18. A method according to claim 17 including plasma spray-coating the aluminum on the tubes to a thickness of 0.016 to 0.024 inches.

19. A cooling pad for a water-cooled stator core of a dynamoelectric machine comprising:

an annular pad for disposition between stator core laminations in the dynamoelectric machine;

at least a pair of generally circumferentially extending cooling tubes disposed in said annular pad at radially spaced, substantially concentric locations relative to one another;

each of said tubes having an inlet and an outlet and extending circumferentially substantially completely about said pad;

each tube being formed of stainless steel and having a coating of aluminum deposited by a plasma spray process, said pad being formed of aluminum cast about said aluminum spray-coated tubes forming an integral bond therewith.

* * * * *